(12) United States Patent
Perstnev et al.

(10) Patent No.: US 11,009,171 B2
(45) Date of Patent: *May 18, 2021

(54) SYSTEMS, COMPOSITIONS AND METHODS FOR CURING LEAKAGES IN PIPES

(71) Applicant: CURAPIPE SYSTEM LTD., Ashkelon (IL)

(72) Inventors: Samuel Perstnev, Mercaz Shapira (IL); Boris Natapov, Ashkelon (IL); Alexander Perstnev, Ashkelon (IL); Reonald Ukhanov, Ashkelon (IL)

(73) Assignee: CURAPIPE SYSTEM LTD., Ashkelon (IL)

( * ) Notice: Subject to any disclaimer, the term of this patent is extended or adjusted under 35 U.S.C. 154(b) by 49 days.

This patent is subject to a terminal disclaimer.

(21) Appl. No.: 16/372,433

(22) Filed: Apr. 2, 2019

(65) Prior Publication Data
US 2019/0226618 A1 Jul. 25, 2019

Related U.S. Application Data

(63) Continuation-in-part of application No. 15/535,717, filed as application No. PCT/IL2015/000053 on Dec. 16, 2015, now Pat. No. 10,288,206.
(Continued)

(51) Int. Cl.
| | |
|---|---|
| *F16L 55/128* | (2006.01) |
| *C08G 59/50* | (2006.01) |
| *C08G 59/62* | (2006.01) |
| *F16L 55/42* | (2006.01) |
| *C08G 59/08* | (2006.01) |

(Continued)

(52) U.S. Cl.
CPC .......... *F16L 55/1283* (2013.01); *C08G 59/08* (2013.01); *C08G 59/5026* (2013.01); *C08G 59/5033* (2013.01); *C08G 59/621* (2013.01); *C08L 63/04* (2013.01); *F16L 55/164* (2013.01); *F16L 55/1612* (2013.01); *F16L 55/38* (2013.01); *F16L 55/42* (2013.01)

(58) Field of Classification Search
CPC . F16L 55/1283; F16L 55/1612; F16L 55/164; F16L 55/38; F16L 55/42
USPC ............................................ 138/97
See application file for complete search history.

(56) References Cited

U.S. PATENT DOCUMENTS

| | | | | |
|---|---|---|---|---|
| 3,144,049 A | * | 8/1964 | Ginsburgh | E21B 33/138 138/97 |
| 3,523,826 A | ‡ | 8/1970 | Lissant | B08B 9/032 134/22.12 |

(Continued)

*Primary Examiner* — Craig M Schneider
*Assistant Examiner* — David R Deal
(74) *Attorney, Agent, or Firm* — Eva Taksel

(57) ABSTRACT

The present invention provides systems, methods and devices for sealing and/or curing a leakage at a remote site in a pipe, the system including a multiplicity of polymeric carrier plugs of a deformable material including pores, at least one sealant composition disposed in the pores; and a carrier liquid composition adapted to transport the multiplicity of polymeric carrier plugs to a site of the leakage, wherein at least some of the multiplicity of polymeric carrier plugs polymeric carrier plugs are adapted to transport the at least one sealant composition from a first site in the carrier liquid composition to a remote site and to seal the leakage at the remote site.

14 Claims, 8 Drawing Sheets

Related U.S. Application Data

(60) Provisional application No. 62/093,839, filed on Dec. 18, 2014.

(51) Int. Cl.
   *F16L 55/16* (2006.01)
   *F16L 55/164* (2006.01)
   *F16L 55/38* (2006.01)
   *C08L 63/04* (2006.01)

(56) References Cited

U.S. PATENT DOCUMENTS

| | | | | |
|---|---|---|---|---|
| 4,252,465 A ‡ | 2/1981 | Broussard | ............... | F16L 1/20 405/158 |
| 4,254,559 A ‡ | 3/1981 | Purinton, Jr. | ......... | B08B 9/0555 34/342 |
| 4,379,722 A ‡ | 4/1983 | Scott | ................ | F16L 55/1011 106/287.17 |
| 4,383,783 A ‡ | 5/1983 | Kruka | ................ | B08B 9/0555 106/266 |
| 4,416,703 A ‡ | 11/1983 | Scott | ................ | B08B 9/0555 134/22.11 |
| 4,543,131 A ‡ | 9/1985 | Purinton, Jr. | ......... | B08B 9/0555 134/22.11 |
| 4,582,091 A ‡ | 4/1986 | Ells | ................ | F16L 55/164 138/89 |
| 5,202,157 A ‡ | 4/1993 | Tomoyasu | ................ | B05C 7/08 134/22.11 |
| 5,609,186 A ‡ | 3/1997 | Satake | ................ | B05C 7/08 138/97 |
| 8,025,738 B2 ‡ | 9/2011 | Munden | ................ | B08B 9/0553 134/166 C |
| 8,950,437 B2 ‡ | 2/2015 | Ryan | ................ | F16L 55/162 138/97 |
| 9,718,985 B2 * | 8/2017 | Maeda | ................ | B05D 3/102 |
| 10,288,206 B2 * | 5/2019 | Perstnev | ................ | C09D 175/04 |
| 2005/0284530 A1 ‡ | 12/2005 | McEwan | ................ | F16L 55/164 138/97 |
| 2012/0067447 A1 ‡ | 3/2012 | Ryan | ................ | E21B 29/10 138/97 |
| 2013/0118401 A1 ‡ | 5/2013 | Horn | ................ | B05C 7/08 118/105 |
| 2014/0100304 A1 ‡ | 4/2014 | Cadix | ................ | C09K 8/508 523/130 |
| 2014/0311605 A1 ‡ | 10/2014 | Perstnev | ................ | F16L 55/1645 138/97 |

\* cited by examiner
‡ imported from a related application

SYSTEMS, COMPOSITIONS AND METHODS FOR CURING LEAKAGES IN PIPES

FIELD OF THE INVENTION

The present invention relates generally to pipeline leakages, and more specifically to methods and apparatus for curing pipeline leakages.

BACKGROUND OF THE INVENTION

Many liquids are transported via subterranean/underwater pipelines. When a leakage crack or hole forms is the pipeline, the liquid leaks therefrom. Often, it takes a long time to detect a leakage and yet longer to locate the leakage site. Oil, gas and water transportation are thus subject to tremendous losses due to pipeline leakage.

There is thus a need to maintain and seal subterranean/underwater pipelines quickly in situ.

Several patent publications in the field include U.S. Pat. No. 3,523,826A, which relates to a process for cleaning a piping system which is characterized by circulating in, and through said system a thixotropic emulsion having a hi.-h volume ratio of internal phase to external phase, the emulsion having an emulsifying agent, an emulsifiable oil and a non-oil, the emulsion being an oil-in-non-oil or a non-oil-in-oil emulsion, the internal phase of said emulsion being present in said emulsion in an amount of at least 80% by volume of the emulsion, said emulsion having the characteristics of a solid when at rest and the characteristics of a liquid when a force is exerted on it, said emulsion tending to be non-adhesive, said emulsion having a critical shear point sufficient to permit pumping at high rates, and said emulsion having an apparent rest viscosity greater than about 1000 cps.

U.S. Pat. No. 4,216,026 describes a method for removing fluid and/or particulate debris from a pipeline, a Bingham plastic fluid plug is passed through a pipeline and the fluid and/or debris are collected by the plug. The plug is pushed through the pipeline with a scraper which in turn may be pushed by liquid or gas pressure. Where the fluid to be removed is water, the Bingham plastic fluid plug employed preferably is a composition of water and a xanthan gum, and the gum may be cross-linked with a multivalent metal. Where the fluid to be removed is a hydrocarbon, the Bingham plastic fluid plug employed preferably is a composition of a mineral oil and an organo-modified smectite, and may also include a particulate filler such as powdered coal.

U.S. Pat. No. 4,252,465A describes a gel plug, which is employed during construction of an offshore pipeline to separate a gas-filled portion of the pipeline from a water-flooded portion, and to facilitate control and movement of the gas/gel plug/water interface as desired to assist in construction operations.

U.S. Pat. No. 4,254,559A relates to an interior surface of a pipeline being dried by sequentially passing through the pipeline (a) an aqueous cross-linked gelled pig, (b) a fluid mobility buffer comprising a non-crosslinked gelled ankanol of from one to three carbon atoms, (c) a dessicating amount of a liquid alkanol from one to three carbon atoms. For example, a pipeline was dried by sequentially passing through it (a) a borate cross-linked hydroxypropyl guar gum pig, (b) a fluid mobility buffer comprising methanol thickened with hydroxypropyl cellulose, and (c) methanol.

U.S. Pat. No. 4,379,722 discloses a gel plug of mineral oil, organo-modified smectite, and a particulate filler such as powdered coal, or a gel plug of mineral oil and organo-modified smectite is employed during construction of an off-shore pipeline to separate a gas-filled portion of the pipeline from a water-flooded portion, and to facilitate control and movement of a gas/gel plug/water interface as desired to assist in construction operations.

U.S. Pat. No. 4,416,703 describes a method to remove particulate debris from a pipeline, a plug train including at least one gel plug having debris entraining characteristics and at least one pseudoplastic plug is passed through a pipeline and the debris is collected by the gel plug. The gel plug is pushed through the pipeline with a scraper which in turn may be pushed by liquid or gas pressure.

U.S. Pat. No. 4,321,968A discloses gelled compositions comprising carboxymethylhydroxyethyl cellulose in aqueous brine solutions, which are gelled by the addition of an alkaline earth metal hydroxide such as calcium hydroxide. The gelled compositions have utility as water diversion agents, pusher fluids, fracturing fluids, drilling muds, workover fluids, and completion fluids.

U.S. Pat. No. 5,346,339A provides a method of cleaning a pipeline using a gel pig of a graft copolymer of a hydroxyalkyl cellulose prepared by a redox reaction with vinyl phosphonic acid. The gel pig is formed by hydrating the graft copolymer in an aqueous liquid. The gel pig is crosslinked by the addition of a Lewis base or Bronsted-Lowry base, to the gel in an amount sufficient to initiate crosslinking of the graft copolymer. Contaminants entrained in the crosslinked gel pig during the cleaning process may be separated by the addition of a pH reducing agent to the pig whereby the viscosity of the gel is caused to decrease. The gel may be used for further cleaning after contaminant separation by addition of an additional quantity of the Lewis base or Bronsted-Lowry base.

WO2008081441 describes a method of repairing leakage in pipelines comprising the steps of forming a first and second openings in the pipeline upstream and downstream, respectively, of the leakage location, inserting through the first opening a first body, filling the space arrear of the first body (C1) with a first viscous sealing material (M1), inserting through the first opening a second body (C2) arrear of the first viscous sealing material (M1) compressing the first sealing material by applying a pressure against the first and the second bodies (C1, C2) in opposite directions, causing the first and second bodies (C1, C2) and the compressed first sealing material (M1) to move in unison in the direction of the second opening, and retrieving the first and second bodies (C1, C2). Preferably, the method is performed using three bodies (C1, C2, C3) and two sealing materials (M1, M2).

Prior art systems often have the following drawback, namely that hardening material which is not in the optimal ratio is fed into the pipeline. Additionally, after exposure of the material in the hole in the pipe, it can remain and may also exit pressure pipe. There are thus still many types of pipeline leakages, which cannot be cured using the aforementioned prior art materials and methods. There thus remains an urgent need to develop systems and methods for curing pipeline leakages.

SUMMARY OF THE INVENTION

It is an object of some aspects of the present invention to provide methods of forming plugging devices for use in systems and methods for sealing pipeline leakages.

The present invention provides systems, methods and devices for sealing and/or curing a leakage at a remote site in a pipe, the system including a multiplicity of polymeric carrier plugs of a deformable material including pores, at least one sealant composition disposed in the pores; and a carrier liquid composition adapted to transport the multiplicity of polymeric carrier plugs to a site of the leakage, wherein at least some of the multiplicity of polymeric carrier plugs polymeric carrier plugs are adapted to transport the at least one sealant composition from a first site in the carrier liquid composition to a remote site and to seal the leakage at the remote site.

There is thus provided according to an embodiment of the present invention, a system for sealing and/or curing a leakage at a remote site in a pipe, the system including;
 a. a multiplicity of polymeric carrier plugs of a deformable material including pores;
 b. at least one sealant composition disposed in the pores; and
 c. a carrier liquid composition adapted to transport the multiplicity of polymeric carrier plugs to a site of the leakage, wherein at least some of the multiplicity of polymeric carrier plugs polymeric carrier plugs are adapted to transport the at least one sealant composition from a first site in the carrier liquid composition to a remote site and to seal the leakage at the remote site.

Additionally, according to an embodiment of the present invention, the at least one sealant composition includes;
 a) a premixed hardening composition; and
 b) a premixed resinous composition.

Furthermore, according to an embodiment of the present invention, the premixed hardening composition including;
 i. diethylenetriamine;
 ii. bisphenol A;
 iii. isophorondiamine; and
 iv. benzyl alcohol.

Yet further, according to an embodiment of the present invention, the premixed resinous composition includes epoxy resin including;
 i. Phenol-Formaldehyde Polymer Glycidyl Ether; and
 ii. Alkyl (C12-C14) glycidyl ether Additionally, according to an embodiment of the present invention, the carrier liquid composition includes;
 i. silica;
 ii. aluminum hydroxide;
 iii. hydroxyethyl cellulose;
 iv. vegetable oil; and
 v. water.

Moreover, according to an embodiment of the present invention, the carrier liquid composition includes;
 i. Silica 0.01-3% w/w;
 ii. aluminum hydroxide 0.01-3% w/w;
 iii. hydroxyethyl cellulose 0.01-5 w/w;
 iv. vegetable oil 5-30% w/w; and
 v. water 20-99% w/w.

Moreover, according to an embodiment of the present invention the carrier liquid composition includes;
 i. Silica 0.1-3% w/w;
 ii. aluminum hydroxide 0.1-3% w/w;
 iii. hydroxyethyl cellulose 0.1-5 w/w;
 iv. vegetable oil 5-20% w/w; and
 v. water 20-99% w/w.

Additionally, according to an embodiment of the present invention, the polymeric carrier plugs are adapted to form a wedge shape.

Furthermore, according to an embodiment of the present invention, the leakage is selected from the group consisting of a hole, a crack, a vein, a crater and combinations thereof.

Moreover, according to an embodiment of the present invention, the system further includes at least one pushing (rear) gel pig, at least two pushing (rear) gel pigs or at least three pushing (rear) gel pigs.

Further, according to an embodiment of the present invention, the at least one pushing (rear) gel pig includes;
 i. a hygroscopic material 0.1-20% w/w;
 ii. boric acid 0.01-10% w/w; and
 iii. water 60-99.9% w/w.

Yet further, according to an embodiment of the present invention, the system further includes at least one front gel pig.

Additionally, according to an embodiment of the present invention, the at least one front gel pig includes;
 i. a hygroscopic material 0.1-20% w/w;
 ii. boric acid 0.01-10% w/w; and
 iii. water 60-99.9%.

Importantly, according to an embodiment of the present invention, the carrier liquid composition includes 0.1 to 20% w/w of the polymeric carrier plugs and 10 to 99.5% w/w of the at least one sealant composition.

Additionally, according to an embodiment of the present invention, the system further includes a first pressurized fluid for conveying the carrier liquid and the multiplicity of polymeric carrier plugs, front and rear gel pigs from the first site to the remote site.

Moreover, according to an embodiment of the present invention, the system further includes a second pressurized fluid for providing a counter pressure to the front pig against the first pressurized fluid.

Additionally, according to an embodiment of the present invention, the first pressurized fluid and the second pressurized fluid are water.

The present invention provides leakage plugging devices and methods for sealing a leakage at a remote site in a pipe, the device including a polymeric carrier plug of a deformable material including pores and at least one sealant composition disposed in the pores, wherein the polymeric carrier plug is adapted to transport the at least one sealant composition from a first site to a remote site and to plug the leakage at the remote site.

In other embodiments of the present invention, a method and system are provided for sealing water transport pipelines.

There is thus provided according to an embodiment of the present invention, a leakage plugging device for sealing a leakage at a remote site in a pipe, the device including;
 a. a polymeric carrier plug of a deformable material including pores; and
 b. at least one sealant composition disposed in the pores, wherein the polymeric carrier plug is adapted to transport the at least one sealant composition from a first site to a remote site and to plug the leakage at the remote site.

Additionally, according to an embodiment of the present invention, the device is of a first dimension and the leakage is of a second dimension.

Furthermore, according to an embodiment of the present invention, the first dimension is in a range of 0.1 mm to 100 mm.

Moreover, according to an embodiment of the present invention, the first dimension is in a range of 1 mm to 50 mm.

Further, according to an embodiment of the present invention, the first dimension is in a range of 2 mm to 15 mm.

Additionally, according to an embodiment of the present invention, the polymeric carrier plug is adapted to penetrate the remote site.

Preferably, according to an embodiment of the present invention, the polymeric carrier plug or a multiplicity of polymeric carrier plugs are adapted to fill at least one of a hole, a crack and breakage causing the leakage at the remote site.

Furthermore, according to an embodiment of the present invention, the polymeric carrier plug or a multiplicity of polymeric carrier plugs are adapted to be condensed at the remote site.

Yet further, according to an embodiment of the present invention, the at least one sealant composition resides within the condensed carrier plug or a multiplicity of polymeric carrier plugs to fill the leakage at the remote site.

Additionally, according to an embodiment of the present invention, the polymeric carrier plug is of a shape selected from the group consisting of wedge-shaped, rhomboid, cubic, polygon, spherical, ovular, egg-shaped, diamond-shaped and pyramid-shaped.

Moreover, according to an embodiment of the present invention, the polymeric carrier plug includes a polymer selected from the group consisting of a foamed material, a polyurethane material, an expanded material, a natural material and a biodegradable polymeric material.

Further, according to an embodiment of the present invention, the at least one sealant composition includes;
  a. an adhesive;
  b. a hardener; and
  c. at least one filler.

Additionally, according to an embodiment of the present invention, the deformable material includes polyurethane and the at least one sealant composition further includes a fatty acid liquid composition.

Furthermore, according to an embodiment of the present invention, the fatty acid liquid composition includes a vegetable oil.

Moreover, according to an embodiment of the present invention, the vegetable oil is selected from the group consisting of sunflower oil, safflower oil, corn oil, soybean oil, canola oil, olive oil and rapeseed oil.

Additionally, according to an embodiment of the present invention, the polymeric carrier plug is adapted to form a narrow head part and wider tail part, wherein the head part is lodged within a hole, a crack and breakage causing the leakage at the remote site.

Further, according to an embodiment of the present invention, a density of the device is increased at least threefold after plugging the site.

There is thus provided according to another embodiment of the present invention, a method for sealing a leakage at a remote site in a pipe, the method including;
  a. introducing a fluid carrier including a plurality of leakage plugging devices according to claim 1, into the pipe at the first site under pressure;
  b. allowing the fluid carrier to transport the devices to the remote site, wherein at least one the devices penetrates the leakage thereby sealing the leakage.

Additionally, according to an embodiment of the present invention, the method further includes;
  c. curing the at least one sealant composition within the devices at the remote site, thereby forming at least one hardened increased-density device.

Additionally, according to an embodiment of the present invention, the method further includes;
  d. removing excess plugging devices and sealant compositions from the pipe after the allowing step.

Moreover, according to an embodiment of the present invention, the sealing includes a hardening step followed by a curing step.

Additionally, according to an embodiment of the present invention, the hardening step occurs within twenty minutes and the curing step occurs within eight to twenty hours.

Furthermore, according to an embodiment of the present invention, the hardening step occurs within ten minutes and the curing step occurs within two hours.

In some cases, the hardening step occurs within five minutes and the curing step occurs within one hour. The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1A-1C show simplified images of a leakage plugging device for in situ repair of a pipe, in accordance with an embodiment of the present invention;

FIG. 2 shows a simplified image of a leakage plugging device for in situ repair of a pipe, in accordance with an embodiment of the present invention;

FIG. 3 shows a simplified schematic diagram of the end product of repair—the pipe from the outside after repair with a sealant plug, in accordance with an embodiment of the present invention;

FIG. 4 shows a simplified schematic diagram of the end product of repair—the pipe from the inside after repair with a sealant plug, in accordance with an embodiment of the present invention; and FIG. 5 shows a simplified flowchart of a method for the preparation of a sealant plug in accordance with an embodiment of the present invention.

Figure 6:
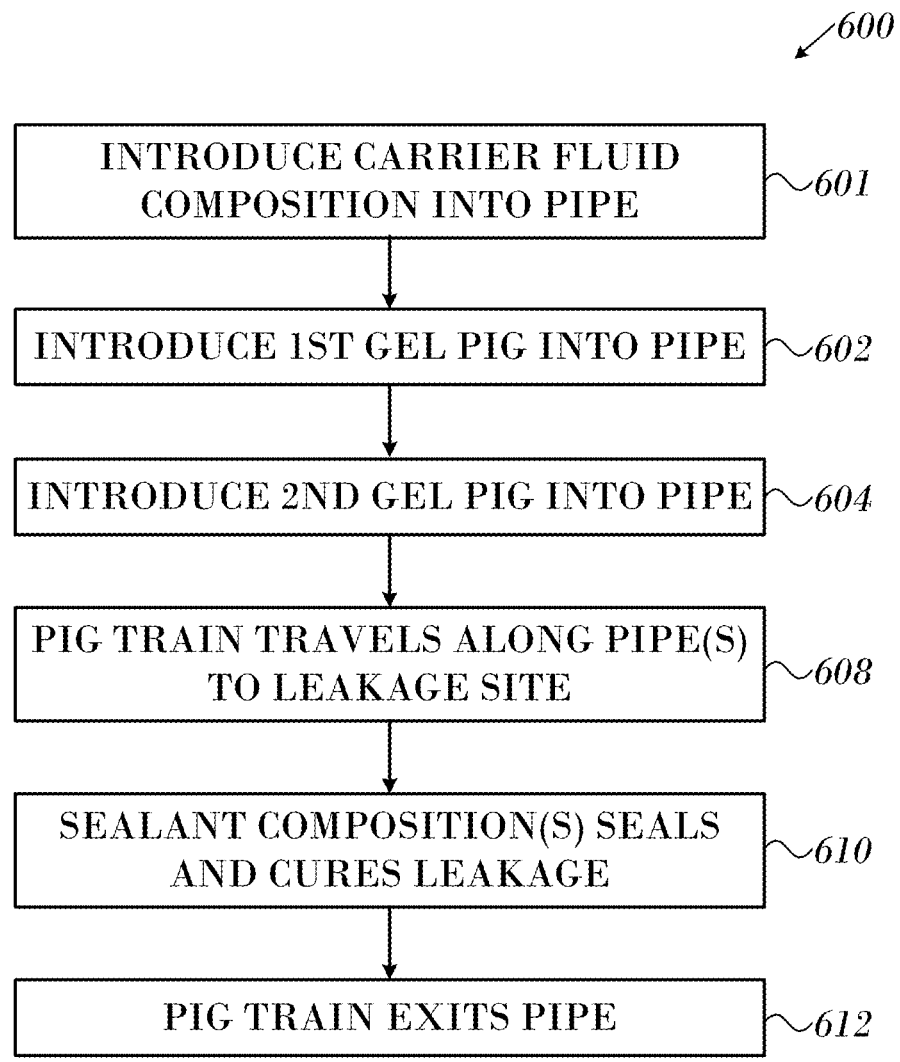
Figure 7:
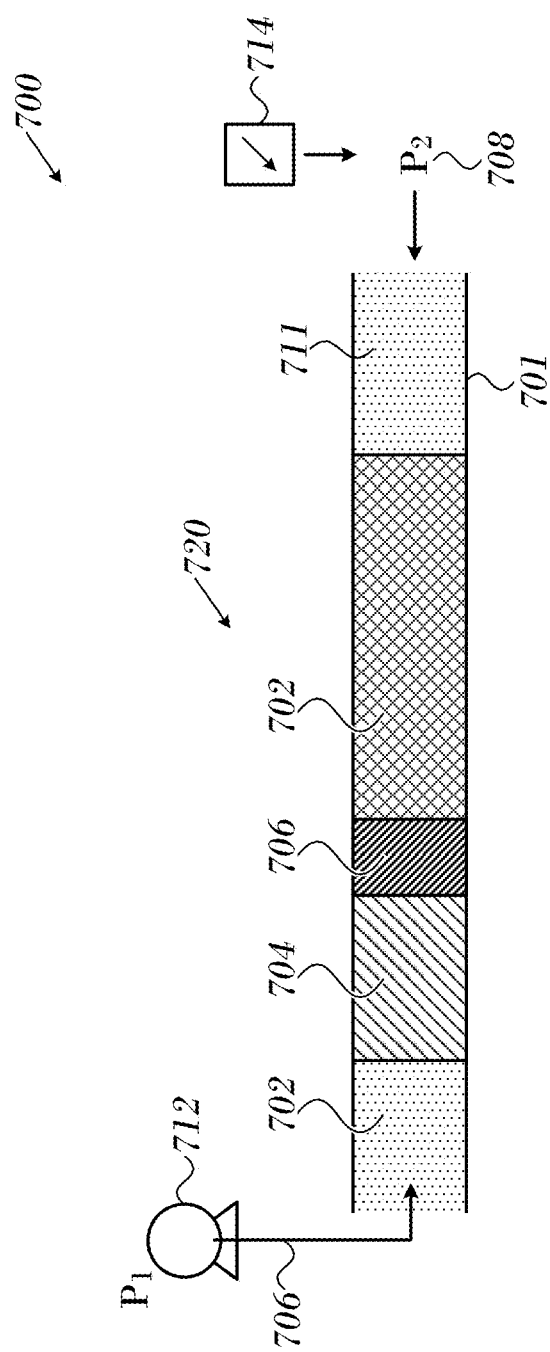
Figure 8:
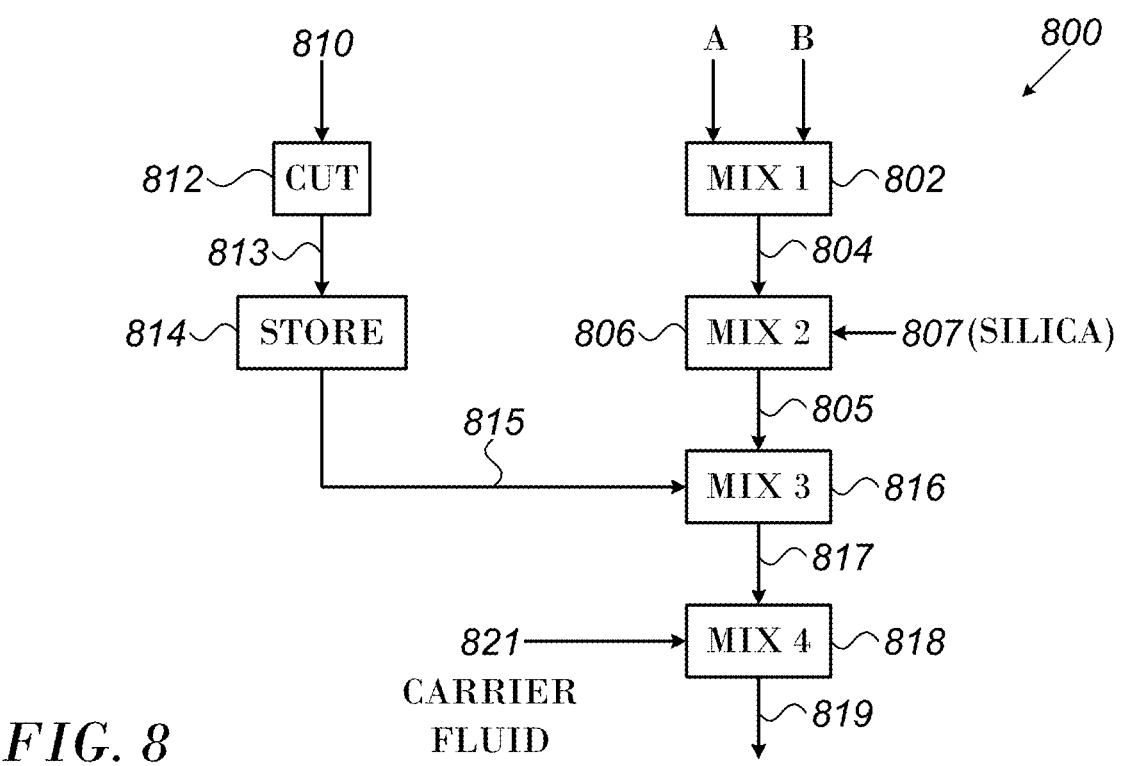

FIG. 6 is a simplified flow chart of another method for sealing a pipeline, in accordance with an embodiment of the present invention; and FIG. 7 is a simplified pictorial illustration showing another system for sealing a pipeline, in accordance with an embodiment of the present invention; and FIG. 8 shows a simplified flowchart of a method for the preparation of a fiber plug in a carrier fluid composition, in accordance with an embodiment of the present invention.

In all the figures similar reference numerals identify similar parts.

DETAILED DESCRIPTION OF THE EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

The present invention provides systems and methods for repairing leaking pipes in situ, apparatus and systems for method implementation, materials and sealant compositions.

The present invention provides leakage plugging devices and methods for sealing a leakage at a remote site in a pipe, the device including a polymeric carrier plug of a deformable material including pores and at least one sealant composition disposed in the pores, wherein the polymeric carrier plug is adapted to transport the at least one sealant composition from a first site to a remote site and to plug the leakage at the remote site.

Prior art systems often have the following drawback, namely that hardening material which is not in the optimal ratio is fed into the pipeline. Additionally, after exposure of the material in the hole in the pipe, it can remain and may also exit pressure pipe.

One of the aims of the present invention is to eliminate the drawbacks of the prior art, that is, the development of a reliable pipe repair process from the inside, as well as development of basic devices, materials and other items needed for reliable pipe repair in real conditions.

When the carrier plugs that are suspended in a composite sealant composition approach the holes in the pipe, they go into the holes and plug them. The remaining plugs and composition are ejected from the pipe and disposed of. Carrier plugs, which have come through the holes in the pipe after the specified time harden and form strong plug, termed herein leakage plugging devices. The pipe is cleaned from residues of the additional material/sealant compositions and plugs. This leaves the final pipeline repaired with in situ leakage plugging device(s) and no/negligible leakage.

By "seal" or "sealing", is meant stopping flow from a leakage site, such as a crack or hole.

By "cure" or "curing" is meant permanently preventing flow from a leakage site, such as a crack or hole, for at least one month.

The pigs, sealant compositions, carrier fluid compositions and chips used in the present invention may be any described in the following patents/patent applications, incorporated herein by reference:—WO2008/081441, to Perstnev et al., WO2016042541A1, WO2016098093A1, WO2016098094A1, WO2016098095A1, U.S. Pat. Nos. 9,045,648, 9,738,798B2, US20170299108A1, US20170363245A1 and US20180003330A1.

The chips may also be called plugs, plugging devices or sealant devices herein.

Figure 1A:
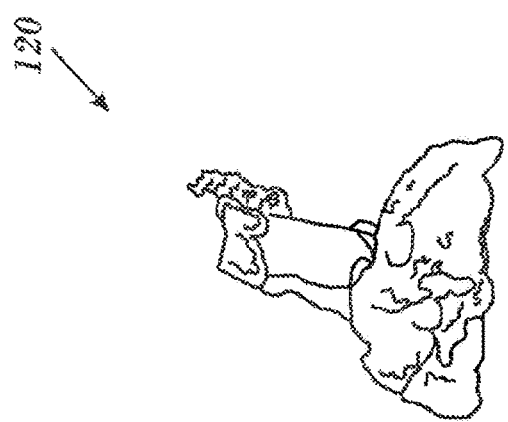
Figure 1B:
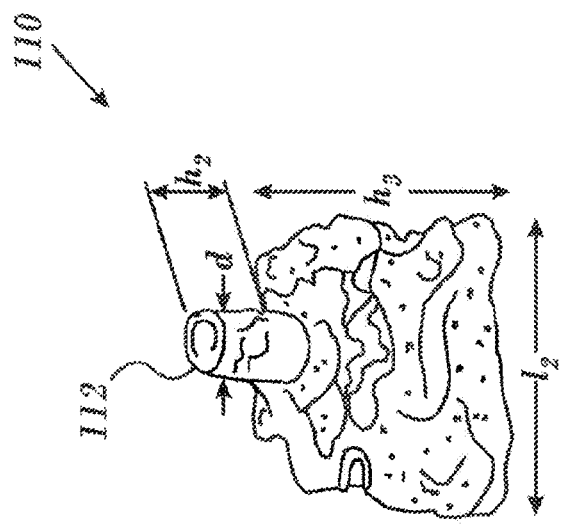
Figure 1C:
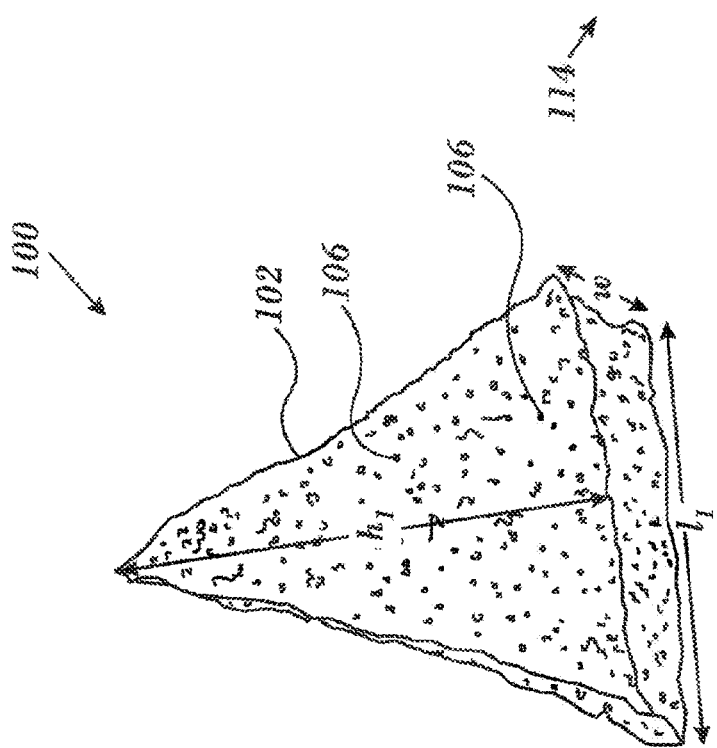

Reference is now made to FIGS. 1A-1C, which show simplified images of a leakage plugging device 100, 110, 120, for in situ repair of a pipe, in accordance with an embodiment of the present invention.

Device 100 is comprises a polymer carrier plug 102 of general three-dimensional shape before use and at least one sealant composition carried therein (not seen). The carrier plug has a height $h_1$, width, $l_1$ and thickness w, before use. After use its shape is changed 110 and forms a head section 112 and tail section 114. The head section is of a length $h_2$ and diameter d. The head section is often of a cylindrical shape if it stoppers a circular hole or often termed pinhole. The tail section may be of a regular or irregular shape of height $h_3$ and width $l_2$. The dimensions after curing (use) depend on the degree of compacting/increasing density thereof. The density may typically increase 1-10 fold and dimensions decrease respectively. The density is typically non-uniform, being greater in the head section and lower in the tail section.

Figure 2:
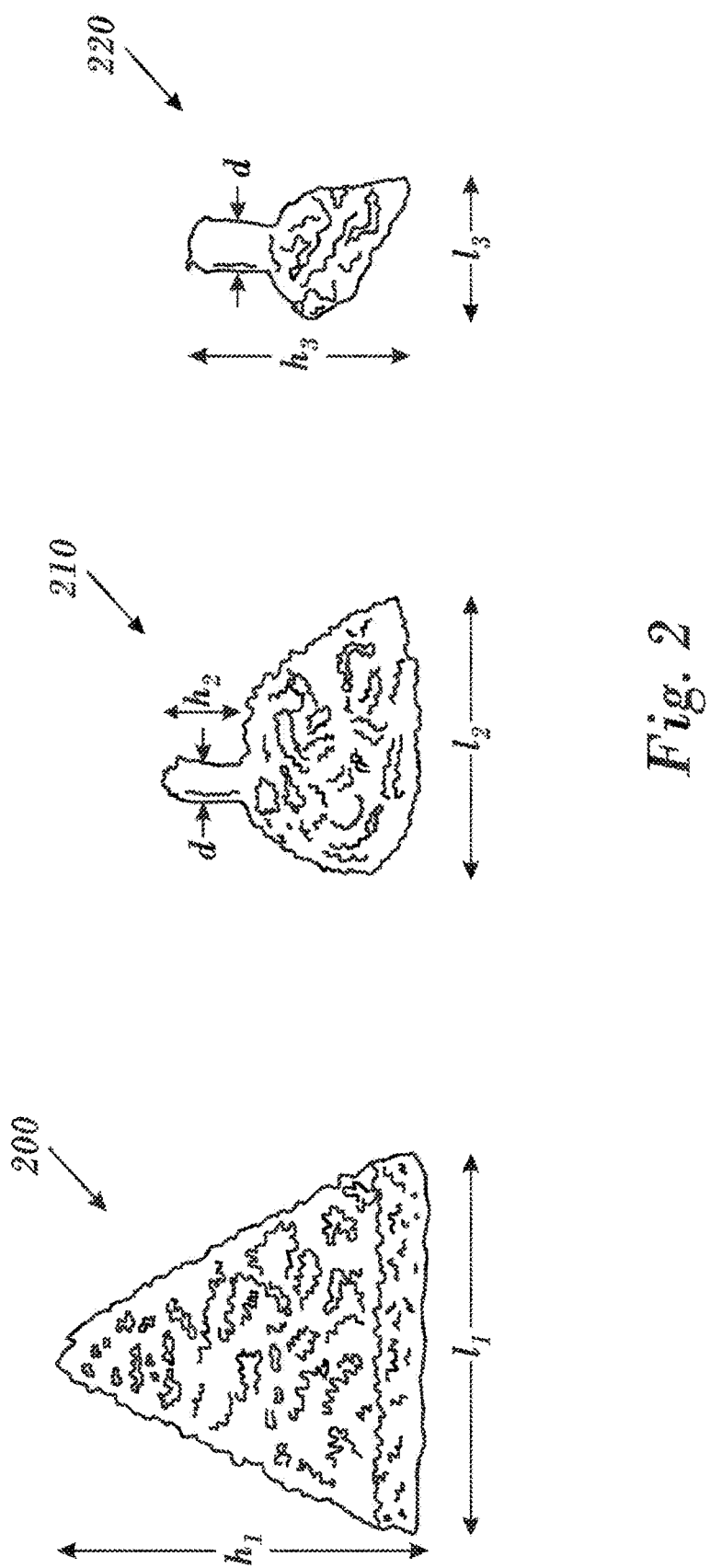

FIG. 2 shows further simplified images of a leakage plugging device for in situ repair of a pipe before use 210, during the curing process 210 and after the curing process 220.

Figure 3:
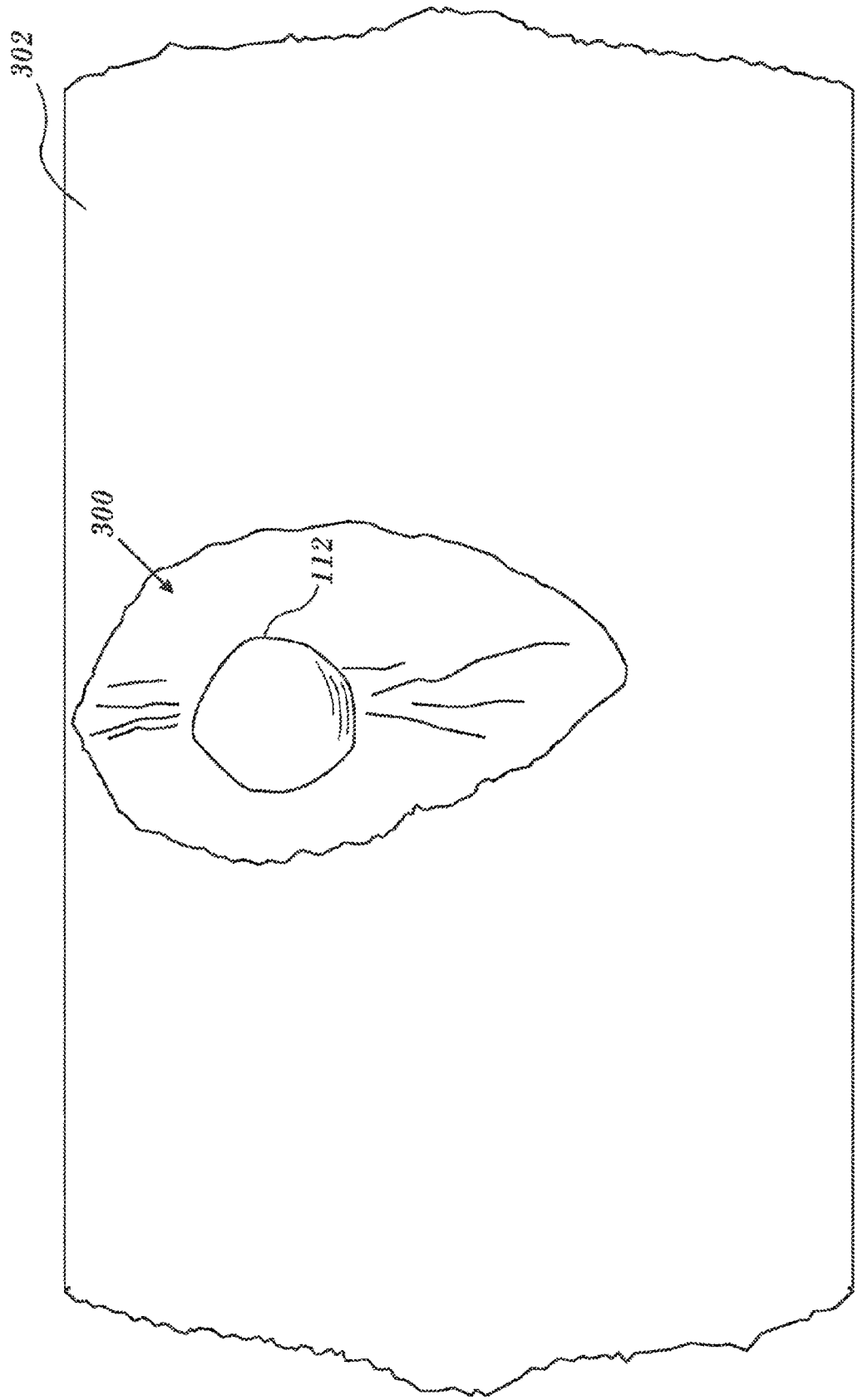

FIG. 3 shows a simplified schematic diagram of the end product of repair—a pipe from the outside after repair 302 with a sealant plug 300 showing part of head section 112.

Figure 4:
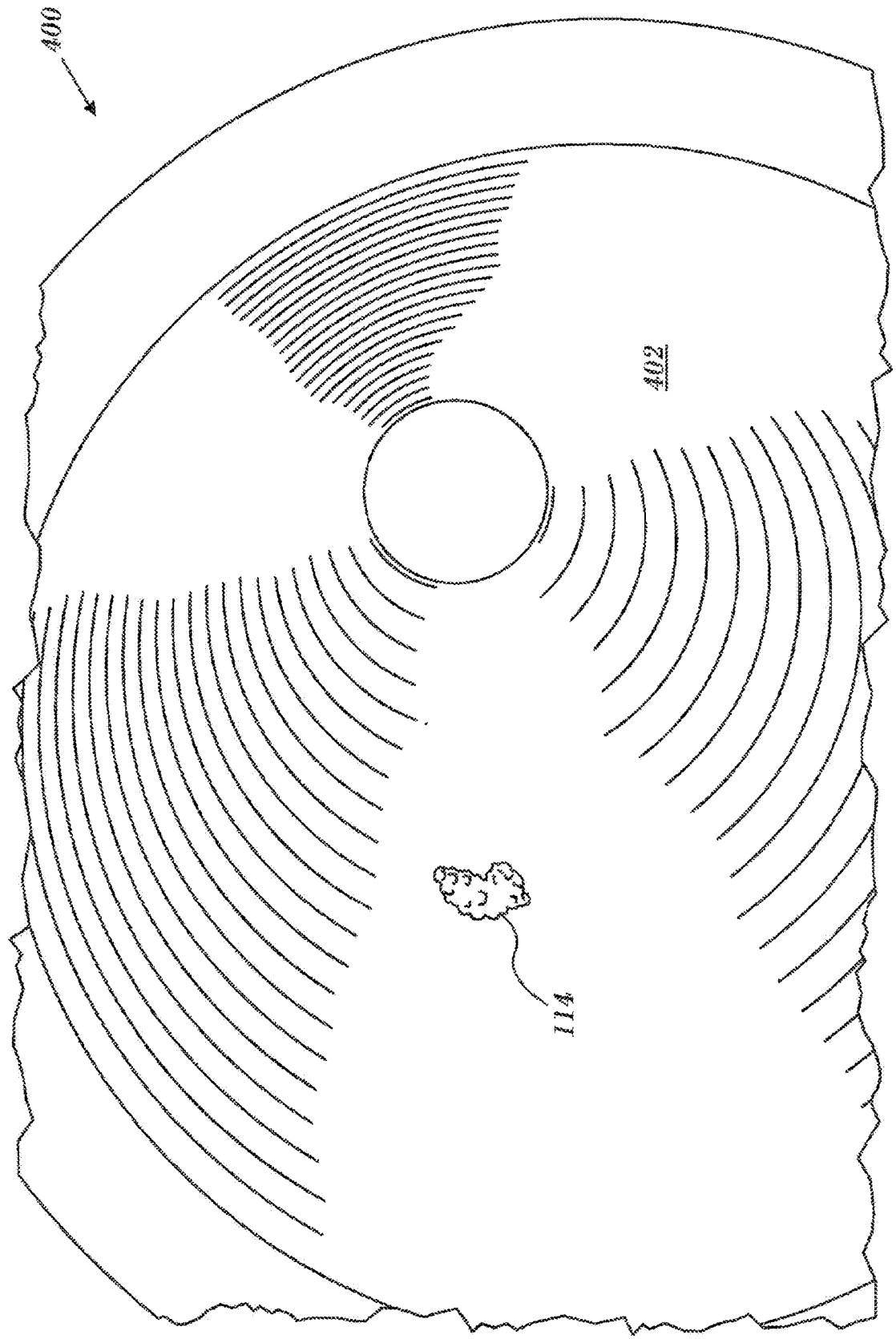

FIG. 4 shows a simplified schematic diagram 400 of the end product of repair—the pipe from the inside after repair 402 with a sealant plug tail (partial view) 114, in accordance with an embodiment of the present invention.

Sealant compositions are introduced into carrier plugs. The unloaded carrier plugs are constructed and configured to:
  a. receive at least one sealant composition thereby forming a loaded carrier plug;
  b. transport the at least one sealant composition along the pipe;
  c. enable the at least one sealant composition to harden and/or expand/and or polymerize and/or be retained in situ at the leakage site (hole/crack/other) thereby forming a leakage plugging device.

The carrier plugs thus form a novel system for plugging/sealing leakage sites in pipes.

The sealant compositions of the present invention may further comprise other particles/solids which remain in the leakage site outside the carrier plugs.

A composite sealant composition may comprise:
  a. one or more sealant compositions;
  b. one or more type of loaded or unloaded carrier plugs;
  c. optionally, at least one filler or particulate; and
  d. other optional additives.

The composite sealant composition comprising some or all of the above, are adapted to be introduced into a pipeline by the help of special devices.

Figure 5:
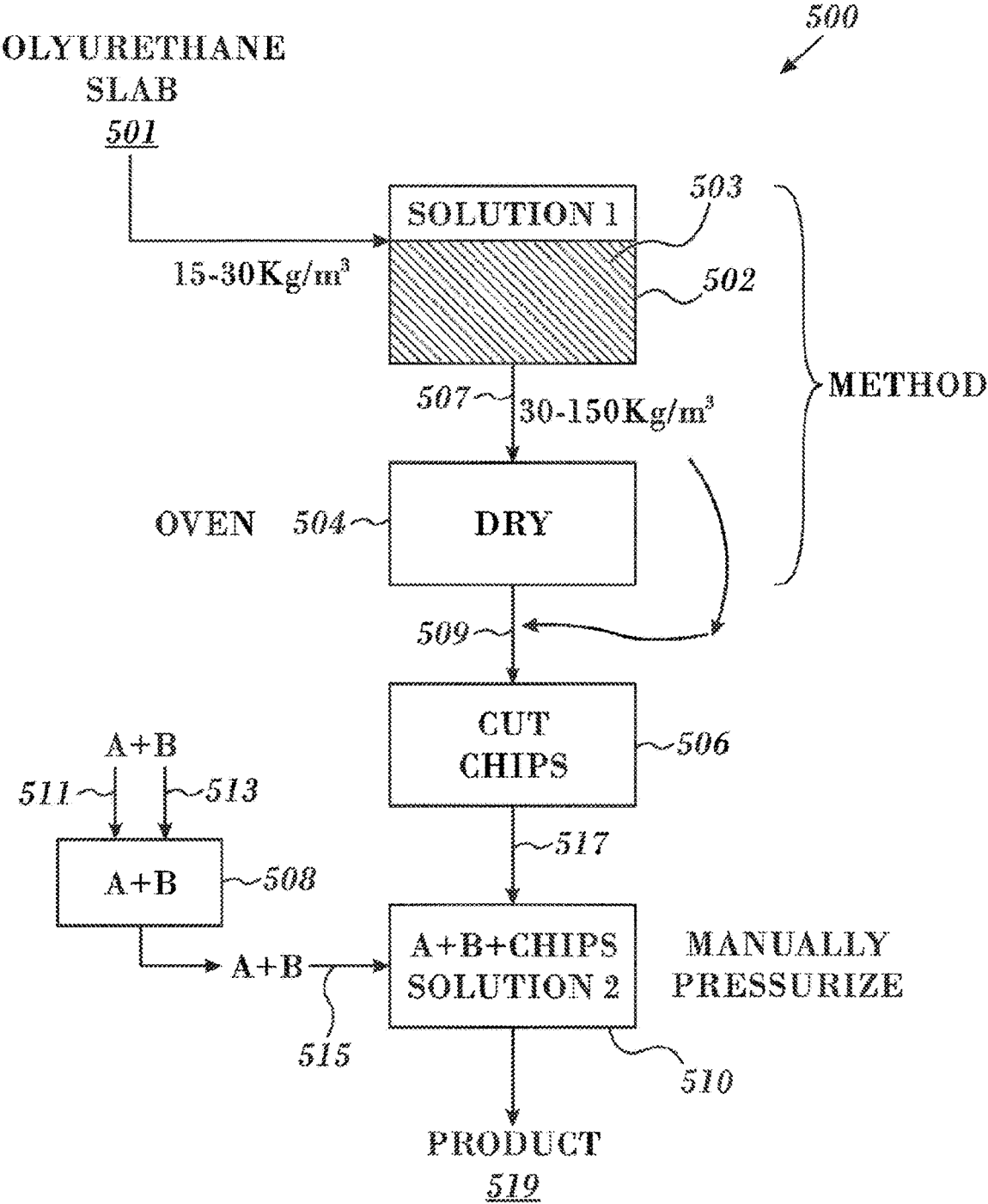

Reference is now made to FIG. 5, which shows a simplified flowchart 500 of a method for the preparation of a sealant plug in accordance with an embodiment of the present invention.

In a first mixing step 502, a polymeric condensable material 501 is introduced into a first solution or suspension 503. The polymeric condensable material, may be, for example, polyurethane of a density of 15-30 kg/m$^3$. According to some embodiments, the density is 15-18 kg/m$^3$.

According to some embodiments, the first solution (solution 1, FIG. 5) is in accordance with that described in U.S. Pat. No. 6,057,378 (FIG. 3 and example 1), incorporated herein by reference.

According to some other embodiments, solution 503 comprises:
  a) At least one polymer, selected from polyurethane, polyacrylate, rubber, plastic, cellulose and combinations thereof in a weight ratio of 5-20% wt/wt.
  b) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 40-90% wt/wt.
  c) At least one surfactant selected from an ionic surfactant, an anionic surfactant, a detergent, an edible oil, an inedible oil and combinations thereof in a weight ratio of 0.01 to 4% wt/wt.

d) At least one gelling agent selected from carrageenan, agar agar, hydroxymethylcelluose, hydroxyethyl cellulose, hydroxypropyl cellulose and combinations thereof in a weight ratio of 0.01 to 4% wt/wt.

e) An antifoam in a weight ratio of 0.01 to 4% wt/wt.

f) A coloring agent selected from a water soluble dye, a water insoluble dye, a paint, an oxide, a metal oxide and combinations thereof in a weight ratio of 0.01 to 1% wt/wt.

The resultant wet impregnated material 507 is typically of a density of 30-150 kg/m$^3$.

The wet impregnated material 507 is then dried in a drying step 504. The drying step may be conducted in a belt dryer, tray drier, oven or any other commercially available drying method, known in the art. The resultant product is a dried impregnated material 509.

In parallel, a second solution or suspension 515 is prepared from a first composition 511 and a second composition 513 in a second mixing step 508. The first composition acts as a hardener.

Some non-limiting examples of the first composition 511 (A) are:— a) A premixed hardening agent comprising polyoxypropylene triamine in a weight ratio of 50 to 90% wt/wt.

b) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 2-20% wt/wt.

c) A coloring agent selected from a water soluble dye, a water insoluble dye, a paint, an oxide, a metal oxide and combinations thereof in a weight ratio of 0.01 to 1% wt/wt.

d) At least one surfactant selected from an ionic surfactant, an anionic surfactant, a detergent, an edible oil, an inedible oil and combinations thereof in a weight ratio of 0.01 to 15 wt/wt.

e) At least one aqueous agent selected from sea water, tap water, distilled water, ice and combinations thereof in a weight ratio of 0.01 to 15% wt/wt.

The second composition (B) 513, FIG. 5 acts as a resinous composition. Some examples of the second composition (B) are:— a) At least one resinous agent selected from bisphenol A, glycidyl ether, bisphenol S, EPI-001 and combinations thereof in a weight ratio of 20 to 90% wt/wt.

b) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 2-20% wt/wt.

c) A coloring agent selected from a water soluble dye, a water insoluble dye, a paint, an oxide, a metal oxide and combinations thereof in a weight ratio of 0.01 to 1% wt/wt.

d) At least one surfactant selected from an ionic surfactant, an anionic surfactant, a detergent, an edible oil, an inedible oil and combinations thereof in a weight ratio of 0.01 to 15 wt/wt.

e) At least one aqueous agent selected from sea water, tap water, distilled water, ice and combinations thereof in a weight ratio of 0.01 to 15% wt/wt.

Thereafter, in a cutting step 506, the dried impregnated material 509 is cut either manually or by machine into little chips in a cutting step 506 to form chips 517.

The chips are typically wedge-shaped having dimensions, such as 0.1-8 cm height, 0.1-6 cm width and 1-30 mm thickness. Additionally or alternatively, the chips may be arrow-shaped, cylindrical, cubic or any other suitable shape.

The chips are mixed with second solution or suspension 515 in a third mixing step 510 to form a plug product 519. According to some embodiments, the chips may be placed under pressure, and upon release, they will suck up some of the second solution or suspension. The plug product 519 may be used for plugging a hole or crack in a pipe.

Some examples of the sealant compositions are provided in the following examples.

Example 1

In this example, the values percent of the fundamental materials A1 and B1, and exemplary weight concentration ranges outside elements.

Composition of material A1(%):
Bisphenol A 50.0-70.0(%)
Glycidyl Ether 7.0-20.0(%)
Inert powdered filler 10.0-20.0(%)
Clay 0-2.0(%)
A detergent precursor 0-5.0(%)
A corrosion resistance provider 0-3.0(%)
Hydrophobic liquid filler 2.0-5.0(%)
Inert liquid filler 4.0-7.0(%)
Silicon dioxide 0.5-1.0(%)
Iron oxide hydroxyl 0.1-0.5(%)
Composition of material B1(%):
Diethylene thiamine 0-23.0(%)
4.4-isopropylidenediphenol 0-16.0(%)
Isophorondiamine 0-31.0(%)
Benzyl alcohol 0-31.0(%)
A surfactant 0-1.0(%)
Detergent precursor 0-5.0(%)
Inert powdered filler 5-15.0(%)
Polyoxypropylene thiamine 0-70.0(%)
A corrosion resistance provider 0-5.0(%)
Clay 0-4.0(%)
4-nonylphenol, branched 0-15.0(%)
Silicon dioxide 0.2-2.0(%)
Iron oxide hydroxyl 0-0.6(%)
Inert liquid filler 1-6.0(%)
Hydrophobic liquid filler 1.0-6.0(%)

These materials once cured serve to provide robust long term plugging of the leakage with a longevity of similar order of magnitude to the remaining useful life of the host pipe. They also serve to withstand changing environmental conditions. The cured product having a similar thermal coefficient in order of magnitude to the host pipe typically expands and contracts under changing temperatures in unison with the host pipe so as not to create a secondary leak under these conditions.

Example 2

This example shows the composition of the sealant plug covering the hole in the pipe and the pipe remains in the field of repair of.

| CAS # | Name component material | Content, % |
|---|---|---|
| 80-05-7 | Bisphenol A | 39 |
| 668609-97-2 | Glycidyl ether | 11 |
| 21645-51-2 | Inert powder filler (synthetic aluminum | 20 |
| 67-53-0 | A corrosion resistance provider | 3 |
| 120962-03 | Rapeseed oil | 6.1 |

-continued

| CAS # | Name component material | Content, % |
|---|---|---|
| 112945-52 | Silicon dioxide | 1 |
| 20344-49 | Iron oxide hydroxyl | 0.3 |
| 1140-40-0 | Diethylene thiamine | 3.5 |
| 80-05-74.4 | Isopropylidenediphenol | 2.5 |
| 2855-13-2 | Isophorondiamine | 4 |
| 100-51-6 | Benzyl alcohol | 4 |
| 9009-54-5 | Polyurethane | 2 |
| 9003-04-7 | Polyacrylate (Tamcril-15) | 3 |
| 9004-62-9 | Berol NP-10 (9) | 0.4 |
| 9004-62-0 | Hydroxyethyl cellulose | 0.1 |
| 8050-81-5 | Antifoam APRU DF-7010 | 0.1 |

Reference is now made to FIG. 6, which is a simplified flow chart 600 of another method for sealing a pipeline, in accordance with an embodiment of the present invention, with reference to system 700 (FIG. 7).

A carrier fluid composition, such as carrier fluid composition 702 (FIG. 7) is introduced to pipeline 701 in a carrier fluid composition introducing step 601. The carrier fluid composition comprises at least one of chips and fibers. For example, carrier fluid composition with fibers (fiber-in-sealant composition 819, FIG. 8) may be used. Alternatively, plug product(s) 519 (termed herein "chips" or "plugging devices" in any carrier fluid composition, as described herein, may be used. This may be performed from one end of the pipe or from a manhole from a fire hydrant, lateral pipe, communication pipe or from a branch pipe or vertical.

A first gel pig composition 706 is introduced to the pipe in a first introducing pig step 602. The gel pig may be introduced from a fire hydrant, from a manhole, vertical, lateral pipe, communication pipe or from a branch pipe.

Thereafter, a second gel pig 704 is introduced from the same end of the pipe as the first sealant composition or from a fire hydrant, from a manhole, vertical, lateral pipe, communication pipe or from a branch pipe, in a second gel pig composition introducing step 604.

The combination of the carrier fluid composition (or chips-in-sealant composition or fibers-in-sealant composition) 702 and gel pigs 706, 704, is termed herein a "pig train". The pig train travels along the pipe in a travelling step 608 to a site 108 of the leakage. The carrier fluid composition(s) provides at least one of plugging devices (plugs or chips) or fibers, which are is/are operative to seal and cure the leakage in a sealing step 610. It typically takes a few minutes to several hours until the seal is fully cured.

The pig train is typically recovered from the pipeline in an exit pipe step 612.

A non-limiting example of a carrier fluid composition 702 is provided in Table 1 hereinbelow.

TABLE 1

Example of a carrier fluid composition.

| Component | Weight percent range | CAS NUMBER(S) |
|---|---|---|
| Pyrogenic silica | 0-3% | 112945-52-5 |
| Synthetic aluminum hydroxide | 0-3% | 21645-51-2 |
| Hydroxyethyl cellulose | 0.1-5% | 9004-62-0, 127-09-3, 9004-34-6, 107-22-2 |
| Vegetable oil | 5-30% | 120962-03-0 |
| water | 20-99% | |

Another non-limiting example of a gel pig composition 704, 706 is provided in Table 2 hereinbelow.

TABLE 2

Exemplary composition of a front or rear gel pig

| Constituent | Constituent % | CAS Numbers | Concentration |
|---|---|---|---|
| Hydroxypropyl Guar Gum | 0.5-5% | 39421-75-5 | — |
| Sodium hydroxide | 0.1-5% | 1310-73-2 | 0.4% w/w |
| Boric Acid | 0.1-5% | 10043-35-3 | 0.59 molar weight = 3.65% w/w |
| Water | 60-99.5% | | — |
| | 100% | | |

Another non-limiting example of a gel pig composition 704, 706 is provided in Table 3 hereinbelow.

TABLE 3

Exemplary composition of a front or rear gel pig

| Constituent | Constituent weight % | CAS Numbers |
|---|---|---|
| Hydroxyethylcellulose | 1-15% | 9004-62-0, 127-09-3, 9004-34-6, 107-22-2 |
| Vegetable oil | 5-30% | 120962-03-0 |
| Water | 40-99.5% | |
| | 100% | |

Reference is now made to FIG. 7, which is a simplified pictorial illustration showing another system 700 for sealing a pipeline, in accordance with an embodiment of the present invention.

System 700 comprises two rear gel pigs 704, 706 and sealant composition 702, forming a pig train 170. The pig train is introduced to a pipeline 701 (which may comprise a mains pipe and many laterals and secondary laterals, for example. This may be performed from one end of the pipe or from a manhole from a fire hydrant, lateral pipe, communication pipe or from a branch pipe or vertical.

A carrier fluid composition 702 is then inserted into the pipeline 701, after the pig train, from a fire hydrant, from a manhole, vertical, lateral pipe, communication pipe or from a branch pipe, and a first pressure $P_1$ 706 is applied to fluid 702. Additionally a second counter-pressure $P_2$, 708 is applied to a second fluid 711. Typically $P_1$ is much greater than $P_2$. The average velocity of pig train 720 is determined by the fluid properties and a pressure difference $(P_1-P_2)$.

Pressure P1 is introduced by a pump 712, pressure from an existing network or any other suitable pressure introducing means, known in the art. The pressure P1 is typically regulated by control means, as are known in the art.

Pressure P2 may be introduced by any suitable passive means, such as a pressure relief valve 714, a discharge valve, a pressure regulator or the like.

Reference is now made to FIG. 8, which shows a simplified flowchart 800 of a method for the preparation of a fiber plug in a carrier fluid composition 819 in accordance with an embodiment of the present invention.

One or more natural fibers 810 are cut in a cutting step 812.

The natural fibers may comprise fibers of a plant, animal, mineral, petrochemical origin and combinations thereof.

The fibers collected from the seeds of various plants are known as seed fibers. Fibers collected from the cells of a leaf are known as leaf fibers, such as ex.-pina, banana, etc.

Bast fibers are collected from the outer cell layers of the plant's stem. These fibers are used for durable yarn, fabric, packaging, and paper. Some examples are flax, jute, kenaf, industrial hemp, ramie, rattan and vine fibers.

For example, the hemp fiber used may comprise one or more of the following: NM8.5/1 (count 8.5 with 1 ply), NM8.5/3 (count 8.5 with 3 ply) and NM8.5/5 (count 8.5 with 5 ply) 100% hemp long fiber yarn ringspun/OE Bleached. Eco-Friendly, Anti-Bacteria, Anti-UV, Moisture-Absorbent Fibers collected from the fruit of the plant, e.g. coconut fiber (coir) bers from the stalks of plants, e.g. straws of wheat, rice, barley, bamboo and straw.

Plant fibers are rich in cellulose and they are a cheap, easily renewable source of fibers with the potential for polymer reinforcement. The presence of surface impurities and the large amount of hydroxyl groups make plant fibers less attractive for reinforcement of polymeric materials. Hemp, sisal, jute, and kapok fibers were subjected to alkalization by using sodium hydroxide.

The nanofibers are bundles of cellulose fibers of widths ranging between 30 and 100 nm and estimated lengths of several micrometers. The chemical analysis showed that selective chemical treatments increased the α-cellulose content of hemp nanofibers from 75 to 94%.

Natural fibers may include one or more of hemp, jute, flax cotton, soft wood, Ramie, Sisal and Bamboo.

Typically, the natural fibers 810 are received as a long yarn. The long yarn may be one-ply, two-ply, three-ply, four-ply or any number of ply or combinations thereof. The long yarn are cut in a cutting step 812 to be of easily manageable dimensions. For example, 8.5 mm and 1-ply. The cut fibers 813 may be stored in a storing step 814 before use.

In one non-limiting example, hemp yarn has a size of Nm 10 (Nm 10 yarn=10,000 meters per kilogram, or about 4,960 yards per pound) from single to multiple plies of 2, 3, 6 and 12 in either natural or bleached (using peroxide) Made from earth-friendly wet spun hemp, these yarns are smooth and durable The yarns may be provided on spools or in packages and may be single-ply, 2-ply, 3-ply, 5-ply, 6-ply and 12-ply or combinations thereof. In some cases, the following types are used: NM8.5/1 (count 8.5 with 1 ply), NM8.5/3 (count 8.5 with 3 ply) and NM8.5/5 (count 8.5 with 5 ply) 100% hemp long fiber yarn ringspun/oe bleached. eco-friendly, anti-bacterial, anti-UV and moisture-absorbent.

A first composition A and a second composition B are mixed in a first mixing step 802.

Composition A comprises hardener (CAS Nos. Diethylenetriamine 1140-40-0, Bisphenol A 80-05-7, Isophorondiamine 2855-13-2, and Benzyl alcohol 100-51-6).

Composition B comprises Epoxy resin (comprising 35068-38-6 Phenol-Formaldehyde Polymer Glycidyl Ether and 68609-97-2 Alkyl (C12-C14) glycidyl ether an acts as a resinous composition.

The ratio of A to B ratio is typically between 10:90 to 50:50, between 15:85 to 40:60, between 20:80 to 35:65, between 25:75 to 30:70. In one embodiment the ratio of A:B is 30:100 i.e. 30 parts of A to 100 parts of B. A and B are as defined herein. The resultant first mix 804 is then mixed in a second mixing step 806 with a silica formulation 807.

In a second mixing step 806, ground silica formulation 807 (comprising cristobalite (CAS Number 4808-60-7), Aluminum oxide CAS Number: 1344-28-1, Iron(III) oxide 1309-37-1 and Titanium(IV) oxide, anatase 1317-70-0) is mixed with first mix 804 to form a second mix 805.

The second mix 805 is mixed with cut fibers 815 to form a third mix 817 in a third mixing step 816.

In a second mixing step 806, ground silica formulation 807 (comprising cristobalite (CAS Number 4808-60-7), Aluminum oxide CAS Number: 1344-28-1, Iron(III) oxide 1309-37-1 and Titanium(IV) oxide, anatase 1317-70-0) is mixed with first mix 804 to form a second mix 805. Typically, the ratio of silica formulation 807 to first mix 804 is 0.1:0.9, 0.2:0.8, 0.3:0.7, 0.4:0.6 or 0.5:0.5. Preferably the ratio is between 0.3:0.7 to 0.5:0.5. The second mix 805 is mixed with cut fibers 815 to form a third mix 817 in a third mixing step 816. Typically, the ratio of cut fibers 815 to second mix 805 is 0.01:0.99, 0.05:0.95, 0.1:0.9, 0.15:0.85 or 0.5:0.5. Preferably the ratio is between 0.03:0.97 to 0.15: 0.85.

A carrier fluid composition 821, as exemplified in Table 4 is introduced and mixed with third mix 817 in a fourth mixing step 818. Typically, the ratio of third mix 817 to carrier fluid composition 821 is 0.1:0.9, 0.2:0.8, 0.3:0.7, 0.4:0.6, 0.5:0.5, 0.6:0.4, 0.7:0.3, 0.8:0.2 or 0.9:0.1. Preferably the ratio is between 0.3:0.7 to 0.5:0.5.

A final carrier fluid composition comprising fibers, termed herein fiber-in-sealant composition 819, is then ready for use.

In another embodiment of the present invention, a non-limiting example of mix 3, 817 appears in table 4 hereinbelow.

TABLE 4 composition of mix 3, 817

| NAME | WEIGHT PERCENT RANGE |
| --- | --- |
| Composition A | 5-30 |
| Composition B | 15-70 |
| Composition 807 | 15-70 |
| Cut fibers 815 | 1-20 |
| TOTAL | 100 |

A non-limiting example of a carrier fluid composition 821 is provided in Table 5 hereinbelow.

TABLE 5

Example of a carrier fluid composition 821.

| Component | Weight percent range | CAS NUMBER(S) |
| --- | --- | --- |
| Pyrogenic silica | 0-3% | 112945-52-5 |
| Synthetic aluminum hydroxide | 0-3% | 21645-51-2 |
| Hydroxyethyl cellulose | 0.1-5% | 9004-62-0, 127-09-3, 9004-34-6, 107-22-2 |
| Vegetable oil | 5-30% | 120962-03-0 |
| water | 20-99% | |

A final carrier fluid composition comprising fibers 819 (also called "fiber-in-sealant composition") is then ready for use.

TABLE 6

Example of Fiber-in-Sealant composition 819

| Component | Weight percent range |
|---|---|
| A | 0.5-4 |
| B | 1-7 |
| Cut fibers (815) | 0.5-5 |
| Silica (807) | 1-6 |
| Carrier fluid composition 821 | 85-98 |
| total | 100 |

The references cited herein teach many principles that are applicable to the present invention. Therefore the full contents of these publications are incorporated by reference herein where appropriate for teachings of additional or alternative details, features and/or technical background. It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. A system for sealing a leakage at a remote site in a pipe, the system comprising:
    a. a multiplicity of polymeric carrier plugs of a deformable material including pores;
    b. at least one sealant composition disposed in the pores; and
    c. a carrier liquid composition adapted to transport said multiplicity of polymeric carrier plugs to a site of said leakage,
wherein at least some of said multiplicity of polymeric carrier plugs are adapted to transport the at least one sealant composition from a first site in said carrier liquid composition to said remote site and to seal said leakage at said remote site;
    wherein said at least one sealant composition comprises a premixed hardening composition, and a premixed resinous composition;
    and wherein said premixed hardening composition comprises:
        i. diethylenetriamine;
        ii. bisphenol A;
        iii. isophorondiamine; and
        iv. benzyl alcohol.

2. A system according to claim 1, wherein said premixed resinous composition comprises epoxy resin comprising:
    i. phenol-formaldehyde polymer glycidyl ether; and
    ii. alkyl (c12-c14) glycidyl ether.

3. A system according to claim 1, wherein said carrier liquid composition comprises:
    i. silica;
    ii. aluminum hydroxide;
    iii. hydroxyethyl cellulose;
    iv. vegetable oil; and
    v. water.

4. A system according to claim 3, wherein said carrier liquid composition comprises:
    i. silica 0.01-3% w/w;
    ii. aluminum hydroxide 0.01-3% w/w;
    iii. hydroxyethyl cellulose 0.01-5 w/w;
    iv. vegetable oil 5-30% w/w; and
    v. water 20-99% w/w.

5. A system according to claim 4, wherein said carrier liquid composition comprises:
    i. silica 0.1-3% w/w;
    ii. aluminum hydroxide 0.1-3% w/w;
    iii. hydroxyethyl cellulose 0.1-5 w/w;
    iv. vegetable oil 5-20% w/w; and
    v. water 20-99% w/w.

6. A system according to claim 1, wherein said polymeric carrier plugs are adapted to form a wedge shape.

7. A system according to claim 1, further comprising at least one pushing (rear) gel pig.

8. A system according to claim 7, wherein said at least one pushing (rear) gel pig comprises:
    i. a hygroscopic material 0.1-20% w/w;
    ii. boric acid 0.01-10% w/w; and
    iii. water 60-99.9% w/w.

9. A system according to claim 7, further comprising at least one front gel pig.

10. A system according to claim 7, wherein said at least one front gel pig comprises:
    i. a hygroscopic material 0.1-20% w/w;
    ii. boric acid 0.01-10% w/w; and
    iii. water 60-99.9%.

11. A system according to claim 1, wherein said carrier liquid composition comprises 0.1 to 10% w/w of said polymeric carrier plugs and 1 to 99% w/w of said at least one sealant composition.

12. A system according to claim 11, further comprising a first pressurized fluid for conveying the carrier liquid and the multiplicity of polymeric carrier plugs, front and rear gel pigs from said first site to said remote site.

13. A system according to claim 12, further comprising a second pressurized fluid for providing a counter pressure to said front pig against said first pressurized fluid.

14. A system according to claim 13, wherein said first pressurized fluid and said second pressurized fluid are water.

* * * * *